United States Patent
Akahane et al.

(10) Patent No.: US 9,107,431 B2
(45) Date of Patent: Aug. 18, 2015

(54) CHOCOLATE OR CHOCOLATE-LIKE FOOD AND METHOD OF PRODUCING THE SAME

(75) Inventors: Akira Akahane, Yokosuka (JP); Maiko Ishizuka, Yokosuka (JP); Takashi Wada, Yokosuka (JP); Satoshi Negishi, Yokosuka (JP)

(73) Assignee: THE NISSHIN OILLIO GROUP, LTD., Tokyo (JP)

( * ) Notice: Subject to any disclaimer, the term of this patent is extended or adjusted under 35 U.S.C. 154(b) by 0 days.

(21) Appl. No.: 14/000,533

(22) PCT Filed: Feb. 10, 2012

(86) PCT No.: PCT/JP2012/053165
§ 371 (c)(1),
(2), (4) Date: Aug. 20, 2013

(87) PCT Pub. No.: WO2012/114914
PCT Pub. Date: Aug. 30, 2012

(65) Prior Publication Data
US 2013/0323397 A1 Dec. 5, 2013

(30) Foreign Application Priority Data
Feb. 22, 2011 (JP) .................................. 2011-036241

(51) Int. Cl.
A23D 7/00 (2006.01)
A23D 9/00 (2006.01)
A23G 1/36 (2006.01)
C11C 3/10 (2006.01)

(52) U.S. Cl.
CPC .. A23G 1/36 (2013.01); A23D 9/00 (2013.01); C11C 3/10 (2013.01)

(58) Field of Classification Search
CPC ............... A23G 1/36; C11C 3/10; A23D 9/00
See application file for complete search history.

(56) References Cited

U.S. PATENT DOCUMENTS

| 4,882,192 | A * | 11/1989 | Maeda et al. ............ | 426/607 |
| 8,357,421 | B2 * | 1/2013 | 't Zand et al. ........... | 426/607 |
| 2012/0128859 | A1 * | 5/2012 | Ohara ..................... | 426/607 |

FOREIGN PATENT DOCUMENTS

| EP | 2 251 428 | 11/2010 |
| JP | 62-134043 | 6/1987 |
| JP | 4-135453 | 5/1992 |
| JP | 2000-109879 | 4/2000 |
| JP | 2002-65162 | 3/2002 |
| JP | 2008-228641 | 10/2008 |
| NL | WO96/10338 | * 4/1996 |
| NL | WO2009/007105 | * 1/2009 |
| WO | 2007/091529 | 8/2007 |
| WO | 2010/070874 | 6/2010 |
| WO | 2010/130395 | 11/2010 |

OTHER PUBLICATIONS

Wille, R. 1966. JAOCS 43:491.*
Shahidi, F. 2005. Bailey's Industrial Oil and Fat Products 6$^{th}$ edition, vol. 4, Wiley Interscience, New Jersey. p. 163.*
Minifie, B. 1980. Chocolate, Cocoa and Confectionery:Science and Technology, 2$^{nd}$ edition. AVI Publishing Co., Inc. Westport, CT. p. 40-41.*
International Search Report issued Mar. 6, 2012 in International (PCT) Application No. PCT/JP2012/053165.
Koyano, Tetsuo, "Recent Progress in the Crystallization of Fats", Journal of Japan Oil Chemists' Society, vol. 48, No. 10, 1999, pp. 1185-1191, with English abstract and cited in ISR.
Koyano et al., "Physical Properties of Equally Mixed Systems of 1,3-Dioleoyl-2-stearoylglycerol/Cocoa Butter and 1,3-Dioleoyl-2-stearoylglycerol-added Dark Chocolate", Journal of the Japan Oil Chemists' Society, vol. 42, No. 3, 1993, pp. 184-189, with English abstract and cited in ISR.
Koyano et al., "Phase Behavior of Mixed Systems of SOS and OSO", Journal of Physical Chemistry, vol. 96, 1992, pp. 10514-10520.
Office Action issued Mar. 11, 2014 in Chinese Application No. 201280009936.X, with English translation.
International Preliminary Report on Patentability issued Aug. 27, 2013 and English translation of the Written Opinion of the International Searching Authority issued Mar. 6, 2012 in International (PCT) Application No. PCT/JP2012/053165.

* cited by examiner

*Primary Examiner* — Patricia George
(74) *Attorney, Agent, or Firm* — Wenderoth, Lind & Ponack, L.L.P.

(57) ABSTRACT

Object: To provide a chocolate or chocolate-like food capable of inhibiting occurrence of low-temperature bloom.

Means for solving problem: A chocolate or chocolate-like food of the present invention comprises an oil and fat, wherein the oil and fat comprises 50 to 85% by weight of triglyceride having an oleic acid at position 2 and saturated fatty acids having 16 or more carbon atoms at positions 1 and 3 (XOX type triglyceride); and 5 to 18% by weight of triglyceride in which two oleic acids are bound and one saturated fatty acid having 16 or more carbon atoms is bound (XO2 type triglyceride). According to such a chocolate or chocolate-like food, the low temperature bloom can be inhibited.

7 Claims, No Drawings

CHOCOLATE OR CHOCOLATE-LIKE FOOD AND METHOD OF PRODUCING THE SAME

CROSS REFERENCE TO RELATED APPLICATION

The present application claims priority under the Paris Convention based on Japanese Patent Application 2011-036241. The entire disclosure of this Japanese patent application is thus included in the present application.

TECHNICAL FIELD

The present invention relates to a chocolate or chocolate-like food that is used at the time of production of a chocolate product and a method of producing the chocolate or chocolate-like food; and more particularly, relates to a chocolate or chocolate-like food containing a specific triglyceride in a specific amount and a method of producing the chocolate or chocolate-like food. In addition, the present invention also relates to a chocolate product using the chocolate or chocolate-like food. Further, the present invention also relates to a method of inhibiting bloom on the chocolate or chocolate-like food.

BACKGROUND ART

A chocolate or chocolate-like food molded into a block- or plate-like shape is often produced by being added with solid fats with relatively high melting point in addition to cocoa butter such that the chocolate or chocolate-like food does not change its shape resulting from loosening the chocolate or chocolate-like food. This is thought to be influenced by circumstances that temperature control was not feasible in a distribution stage and it was not uncommon for the chocolate product to be exposed to high temperatures. However, the shipment at a variety of temperature ranges appropriate to the type of food product has become available in these days. There is no need to worry about a chocolate mix melting during the stage of distribution and, in contrast, occurrence of low-temperature bloom is becoming problematic in the chocolate product, which low-temperature bloom is caused by the chocolate product being kept at low-temperatures.

Occurrence of low-temperature bloom is often problematic particularly in the chocolate product added with nuts and seeds such as almonds, macadamia nuts, hazelnuts or peanuts. In a chocolate product containing the nuts and seeds, oil and fat migration between fats contained in the nuts and seeds and fats contained in a chocolate mix may sometimes occur, which causes deterioration of the quality of the product. The nuts and seeds lose color and gloss, get dried and slightly opaque, and change to have too crunchy textures. Meanwhile, the phenomena of occurrence of bloom in a chocolate mix with a chalky look, loss of a shiny sheen, and change in hardness are seen.

From such circumstances, inhibition of bloom occurrence at low temperatures, rather than heat resistance at high temperatures, is being required in the chocolate product. Further, improvement of textures of the chocolate or chocolate-like food, which have been put second to heavily-weighed heat resistance, has been advanced. In view of this, various twists including inhibiting low temperature bloom and improving the texture of the chocolate or chocolate-like food have been added.

For example, it has been suggested to inhibit occurrence of bloom caused by oil and fat migration in mixed food products in which chocolate is combined with a nut or the like by using an oil and fat composition containing specific polyglycerol fatty acid ester in the chocolate (for example, see Patent Document 1). However, it was not necessarily preferred in that a large amount of synthetic emulsifier was used as an essential component.

Further, it has been suggested to produce a chocolate having soft textures, bloom resistance and grain resistance by using an oil and fat composition containing a specific triglyceride in the chocolate (for example, see Patent Document 2). However, because of a soft chocolate mix obtained by utilizing a palm soft fraction, it could not be said that the composition was suitable for chocolate products with a block- or plate-like shape.

PRIOR ART REFERENCES

Patent Documents

Patent Document 1: WO 2007/091529
Patent Document 2: Japanese Patent Application Laid-Open Publication No. 2008-228641

SUMMARY OF THE INVENTION

Problems to be Solved by the Invention

An object of the present invention is to provide a chocolate or chocolate-like food capable of inhibiting occurrence of low-temperature bloom. Further, another object of the present invention is to provide a method of inhibiting low-temperature bloom on the chocolate or chocolate-like food by adjusting a specific triglyceride in an oil and fat to a specific amount.

Means for Solving the Problems

In order to solve the above-mentioned problems, the present inventors intensively studied and discovered that the adjustment of a specific triglyceride in an oil and fat to a specific amount can solve the above problem in the production of a chocolate and/or chocolate-like food, thereby completing the present invention.

That is, according to one embodiment of the present invention,
a chocolate or chocolate-like food comprising an oil and fat is provided,
wherein the oil and fat comprises 50 to 85% by weight of triglyceride in which oleic acid is bound at position 2 and saturated fatty acids having 16 or more carbon atoms is bound at positions 1 and 3 (XOX type triglyceride); and 5 to 18% by weight of triglyceride in which two oleic acids are bound and one saturated fatty acid having 16 or more carbon atoms is bound (XO2 type triglyceride).

Further, according to another embodiment of the present invention,
a chocolate product comprising the above chocolate or chocolate-like food is provided.

Further, according to another embodiment of the present invention,
a method of inhibiting low-temperature bloom on a chocolate or chocolate-like food comprising an oil and fat is provided,
the method comprising making a content of triglyceride having an oleic acid at position 2 and saturated fatty acids having 16 or more carbon atoms at positions 1 and 3 (XOX type triglyceride) to 50 to 85% by weight; and making a content of triglyceride in which two oleic acids are bound and one saturated fatty acid having 16 or more carbon atoms is bound (XO2 type triglyceride) to 5 to 18% by weight in the oil and fat.

Further, according to another embodiment of the present invention, an oil and fat composition comprising 30 to 50% by weight of triglyceride in which oleic acid is bound at position 2 and stearic acid is bound at positions 1 and 3 (StOSt type triglyceride) and 20 to 45% by weight of triglyceride in which two oleic acids are bound and one stearic acid is bound (StO2 type triglyceride) is provided.

Further, according to another embodiment of the present invention, a method of producing the above oil and fat composition is provided, the method comprising the step of bringing an oil and fat rich in triglycerides in which oleic acid is bound at position 2 and lower alkyl ester of stearic acid into a transesterification reaction.

Further, according to another embodiment of the present invention, a method of producing a chocolate or chocolate-like food comprising an oil and fat is provided, the method of producing a chocolate or chocolate-like food comprising blending the above oil and fat composition in an oil and fat of the chocolate or chocolate-like food in the amount of 5 to 40% by weight.

Further, according to another embodiment of the present invention, a method of inhibiting low-temperature bloom on a chocolate or chocolate-like food comprising an oil and fat is provided, the method of inhibiting low-temperature bloom comprising blending the above oil and fat composition in the oil and fat of the chocolate or chocolate-like food in the amount of 5 to 40% by weight.

Further, according to another embodiment of the present invention, a low-temperature bloom inhibitor comprising 30 to 50% by weight of triglyceride in which oleic acid is bound at position 2 and stearic acid is bound at positions 1 and 3 (StOSt type triglyceride) and 20 to 45% by weight of triglyceride in which two oleic acids are bound and one stearic acid is bound (StO2 type triglyceride) is provided.

Effect of the Invention

According to the present invention, low temperature bloom can be inhibited on a chocolate or chocolate-like food. In addition, a method of inhibiting such low-temperature bloom and low-temperature bloom inhibitor can be provided. Further, according to the present invention, the texture and snap property of the chocolate or chocolate-like food become good.

MODE FOR CARRYING OUT THE INVENTION

Definitions and Analysis

In the present invention, a triglyceride in an oil and fat refers to one having a structure of three molecules of fatty acids binding to one molecule of glycerol via ester bonds. Position 1, 2, or 3 of the triglyceride refers to a position at which the fatty acids bind. The following is used as an abbreviated name of constituent fatty acids of the triglyceride. X: saturated fatty acid having 16 or more carbon atoms, P: palmitic acid, St: stearic acid, Ar: arachidic acid, U: unsaturated fatty acid having 16 or more carbon atoms, O: oleic acid. Analysis of triglyceride composition can be carried out using gas chromatography (in reference to JAOCS, vol 70, 11, 1111-1114 (1993)) and a silver ion column-HPLC method (in reference to J. High Resol. Chromatogr., 18, 105-107 (1995)). Further, analysis of constituent fatty acids of an oil and fat can be carried out using gas chromatography (in reference to AOCS Ce1f-96).

I. Chocolate or Chocolate-Like Food

The term "a chocolate or chocolate-like food" of the present invention means an oil-based food product containing an oil and fat, wherein the oil and fat is a continuous phase. The chocolate or chocolate-like food preferably contains sugars. In addition, the "a chocolate or chocolate-like food" of the present invention is preferably a chocolate. It is worth noting that the chocolate of the present invention is not limited by the code "Fair Competition Codes concerning Labeling on Chocolate and/or Chocolate-like Food" (Japan Chocolate Industry Fair Trade Conference) or by definitions covered in laws and regulations, and refers to one produced by adding cacao mass, cocoa powder, edible oil and fat (such as cocoa butter), sugars as major raw materials, and dairy products, flavoring agents, emulsifiers or the like as necessary; and by undergoing the steps of chocolate production. Further, the chocolate or chocolate-like food of the present invention also includes, besides dark chocolate and milk chocolate, white chocolate and colored chocolate in which cacao mass or cocoa powder is not used. Furthermore, the chocolate or chocolate-like food of the present invention is preferably a tempering type chocolate or chocolate-like food.

The oil and fat contained in the chocolate or chocolate-like food of the present invention are ones containing 50 to 85% by weight, preferably 60 to 82% by weight, more preferably 65 to 75% by weight of triglyceride in which oleic acid is bound at position 2 and saturated fatty acids having 16 or more carbon atoms is bound at positions 1 and 3 (XOX type triglyceride); and 5 to 18% by weight, preferably 6 to 16% by weight, more preferably 7 to 14% by weight of triglyceride in which two oleic acids are bound and one saturated fatty acid having 16 or more carbon atoms is bound (XO2 type triglyceride). The XO2 type triglyceride includes a triglyceride in which the saturated fatty acid having 16 or more carbon atoms is bound at position 1 and oleic acid is bound at positions 2 and 3 (XOO type triglyceride) and a triglyceride in which oleic acid is bound at positions 1 and 3 and a saturated fatty acid having 16 or more carbon atoms at position 2 (OXO type triglyceride). The content of the above XO2 type triglyceride is a total amount of these. Note that the XOO type triglyceride may be expressed also as an OOX type triglyceride but both have the identical structure. Low temperature bloom on a chocolate or chocolate-like food can be inhibited by adjusting the XOX type triglyceride and XO2 type triglyceride in an oil and fat of a chocolate or chocolate-like food to an amount within the above range. In addition, texture and snap property of the chocolate or chocolate-like food become good.

In the above XOX type triglyceride and XO2 type triglyceride, the saturated fatty acid X has 16 carbon atoms or more, preferably 16 to 26 carbon atoms, more preferably 16 to 24 carbon atoms, still more preferably 16 to 22 carbon atoms, and further more preferably 16 to 20 carbon atoms. Further, two saturated fatty acids Xs bound to each of the triglyceride molecules may not be same saturated fatty acids or may be different saturated fatty acids. Examples of the saturated fatty acid X include palmitic acid (16), stearic acid (18), arachidic acid (20), behenic acid (22), and lignoceric acid (24). The number noted above is the number of carbon atoms in the fatty acid.

According to a preferred embodiment of the present invention, the above oil and fat comprise, as one of the XOX type triglycerides, a triglyceride in which oleic acid is bound at position 2 and palmitic acid is bound at positions 1 and 3 (POP type triglyceride) in the amount of preferably 3 to 30% by weight, more preferably 5 to 25% by weight, and still more preferably 7 to 20% by weight.

According to a preferred embodiment of the present invention, the above oil and fat comprise, as one of the XOX type triglycerides, a triglyceride in which oleic acid is bound at position 2 and palmitic acid and stearic acid are bound at each of positions 1 and 3 (POSt type triglyceride) in the amount of preferably 12 to 40% by weight, more preferably 16 to 36% by weight, and still more preferably 20 to 35% by weight.

According to a preferred embodiment of the present invention, the above oil and fat comprise, as one of the XOX type triglycerides, a triglyceride in which oleic acid is bound at position 2 and stearic acid at is bound at positions 1 and 3 (StOSt type triglyceride) in the amount of preferably 22 to 36% by weight, more preferably 24 to 34% by weight, still more preferably 26 to 32% by weight.

According to a preferred embodiment of the present invention, the above oil and fat comprise, as one of the XOX type triglycerides, a triglyceride in which oleic acid is bound at position 2 and stearic acid and arachidic acid are bound at each of positions 1 and 3 (StOAr type triglyceride) in the amount of preferably less than 7% by weight, more preferably less than 2% by weight, and still more preferably 0.1 to 1.4% by weight. With the StOAr type triglyceride in the above oil and fat being set within the above range, the solidification rate of a chocolate or chocolate-like food increases and thus ease of handling at the time of production of the chocolate or chocolate-like food can be more improved.

With the amount of the XOX (POP, POSt, StOSt, and StOAr) type triglyceride which is a symmetric type triglyceride being within the above range in the above oil and fat, low temperature bloom on the chocolate or chocolate-like food produced using the oil and fat can be more inhibited. In addition, the texture and snap property of the chocolate or chocolate-like food become good.

According to a preferred embodiment of the present invention, the above oil and fat comprise, as the XO2 type triglyceride, a triglyceride in which two oleic acids are bound and one stearic acid is bound (StO2 type triglyceride: a total of StOO type (a triglyceride in which stearic acid is bound at position 1 and oleic acid is bound at positions 2 and 3) and OStO type (a triglyceride in which oleic acid is bound at positions 1 and 3 and stearic acid is bound at position 2)) in the amount of preferably 4 to 16% by weight, more preferably 5 to 14% by weight, and still more preferably 6 to 12% by weight. Note that the StOO type triglyceride may be expressed also as an OOSt type triglyceride but both have the identical structure.

According to a preferred embodiment of the present invention, the above oil and fat comprise a triglyceride in which unsaturated fatty acid having 16 or more carbon atoms is bound at all of positions 1, 2, and 3 (U3 type triglyceride) in the amount of preferably less than 5% by weight, more preferably less than 4% by weight, and still more preferably less than 3% by weight.

In the above U3 type triglyceride, the unsaturated fatty acid U has 16 carbon atoms or more, preferably 16 to 26 carbon atoms, more preferably 16 to 24 carbon atoms, still more preferably 16 to 20 carbon atoms, and further more preferably 16 to 18 carbon atoms. Further, three unsaturated fatty acids U bound to each of the triglyceride molecules may be same unsaturated fatty acids or may be different unsaturated fatty acids. Examples of the unsaturated fatty acid U include palmitoleic acid (16:1), oleic acid (18:1), linoleic acid (18:2), and linolenic acid (18:3). The number noted above is a combination of the number of carbon atoms in the fatty acid and the number of double bonds.

According to a preferred embodiment of the present invention, the above oil and fat comprise a triglyceride in which saturated fatty acid having 16 or more carbon atoms is bound at all of positions 1, 2, and 3 (X3 type triglyceride) in the amount of preferably less than 4% by weight, more preferably less than 3% by weight, and still more preferably less than 2% by weight. In the above X3 type triglyceride, the saturated fatty acid X is as described above.

According to a preferred embodiment of the present invention, the above oil and fat comprise, as a constituent fatty acid, a trans fatty acid in the amount of preferably less than 2% by weight, more preferably less than 1% by weight, and still more preferably less than 0.5% by weight. With the amount of the trans fatty acid being approximately within the above range, it is nutritionally preferred.

In the chocolate or chocolate-like food of the present invention, the content of the oil and fat is preferably 20 to 80% by weight, more preferably 25 to 70% by weight, and still more preferably 30 to 60% by weight. In the present invention, the oil and fat include, besides the blended oil and fat, an oil and fat that are contained in raw materials containing oils such as cacao mass (containing cocoa butter in the amount of about 55% by weight) or whole milk powder (containing milk fat in the amount of about 25% by weight).

According to a preferred embodiment of the present invention, as long as the above oil and fat satisfactorily have the content of triglyceride described above, any oil and fat raw materials and processing methods may be employed as raw material oil and fat. Natural oil and fat raw materials may be solely used, or two or more types thereof may be blended. Also, a oil and fat which underwent treatment such as fractionation, transesterification or hydrogenation may be used. Preferred examples of oil and fat raw materials used in the above oil and fat include cocoa butter, palm oil, palm fractionated oil, Shea fat, Shea fractionated oil, sal fat, sal fractionated oil, Illipo butter, kokum butter, mango fat, mango fractionated oil, and an oil and fat rich in XOX type triglycerides that are produced by transesterification. Further, for example, one or more from animal and vegetable oils and fats such as soybean oil, rapeseed oil, cotton seed oil, safflower oil, sunflower oil, rice oil, corn oil, sesame oil, olive oil, beef tallow, lard, or milk fat, or processed oil and fat thereof may be combined to be used. Further, raw materials containing oils such as cacao mass or cocoa powder which contains cocoa butter or whole milk powder which contain milk fat may be used. In the present invention, conventionally known methods can be employed for the treatment including fractionation, transesterification and hydrogenation. A method of transesterification treatment is not particularly restricted and the transesterification can be carried out by a known method. For example, it can be carried out by either of the methods of chemical transesterification using a synthesis catalyst such as sodium methoxide and enzymatic transesterification using lipase as a catalyst.

With regard to palm fractionated oil, used in the above oil and fat, for example, olein fraction (liquid fraction) and stearin fraction (solid fat fraction) obtained by subjecting palm oil to dry fractionation, solvent fractionation, or emulsification fractionation can be both used. A palm mid-fraction such as olein fraction obtained by further fractionating the palmstearin fraction, or stearin fraction obtained by further fractionating the palm olein fraction can be a source of supply for an XOX type triglyceride contained in the above oil and fat. Further, olein fraction (palm super olein) obtained by further fractionating the palm olein fraction can be a source of supply of the XO2 type triglyceride.

A oil and fat rich in XOX type triglycerides used in the above oil and fat can be produced by, for example, carrying out a transesterification reaction using the oil and fat rich in triglycerides with oleic acid attached at position 2 (for example, high oleic sunflower oil or the like) and fatty acid lower alkyl ester (for example, ethyl stearate, palmitic acid ethyl ester or the like) with an enzyme agent with selectivity for 1- and 3-positions by a known method to obtain transesterified oils; and further carrying out fractionation treatment into the transesterified oils to fractionate and obtain an midfraction. The oil and fat rich in XOX type triglycerides contain the XOX type triglyceride in the amount of preferably more than 50% by weight, more preferably 60 to 90% by weight, and still more preferably 75 to 90% by weight. The oil and fat rich in XOX type triglycerides can be a source of supply of the XOX type triglyceride contained in the above oil and fat.

According to another embodiment of the present invention, it is preferred that the above oil and fat contain an oil and fat composition (oil and fat composition A) comprising the StOSt type triglyceride in the amount of 30 to 50% by weight and the StO2 type triglyceride in the amount of 20 to 45% by weight. The above oil and fat composition A contains the StOSt type triglyceride in the amount of preferably 30 to 47% by weight, and more preferably 35 to 45% by weight; and the StO2 type triglyceride in the amount of preferably 20 to 40% by weight, and more preferably 23 to 38% by weight.

According to another embodiment of the present invention, the above oil and fat composition A contains the StOAr type triglyceride in the amount of preferably less than 2% by weight, more preferably 0.1 to 1.4% by weight, and still more preferably 0.1 to 1.0% by weight. Further, the above oil and fat composition A contains the X3 type triglyceride in the amount of preferably less than 3% by weight, more preferably 2% by weight, and still more preferably 1% by weight.

Further, the above oil and fat composition A contains, as a constituent fatty acid, a trans fatty acid in the amount of preferably less than 2% by weight, more preferably less than 1% by weight, and still more preferably less than 0.5% by weight. With the StOAr type triglyceride in the above oil and fat composition A being set within the above range, the solidification rate of a chocolate or chocolate-like food increases and thus ease of handling at the time of production of the chocolate or chocolate-like food can be more improved.

According to another embodiment of the present invention, the above oil and fat is mixed oil and fat containing the above oil and fat composition A in the amount of preferably 5 to 40% by weight, more preferably 8 to 35% by weight, and still more preferably 10 to 25% by weight. With the content of the above oil and fat composition A in the oil and fat of the chocolate or chocolate-like food being set in the above range, ease of handling at the time of production of the chocolate or chocolate-like food and the texture and snap property of the chocolate or chocolate-like food can be more improved.

According to another embodiment of the present invention, as the above oil and fat composition A, transesterified oils obtained by carrying out a transesterification reaction using oil and fat rich in triglycerides with oleic acid attached at position 2 and lower alkyl ester of stearic acid with an enzyme agent with selectivity for 1- and 3-positions by a known method can, for example, be used. Further, it is preferred to use an olein fraction (liquid fraction) obtained by removing the X3 type triglyceride by fractionation treatment of the transesterified oils. The oil and fat rich in triglycerides in which oleic acid is bound at position 2 contain the triglyceride in which oleic acid is bound at position 2 in the amount of preferably not less than 70% by weight, more preferably 75 to 95% by weight, and still more preferably 80 to 90% by weight. In the lower alkyl ester of stearic acid, lower alkyl preferably has 1 to 4 carbon atoms, and more preferably 1 to 2 carbon atoms. The lower alkyl ester of stearic acid is more preferably ethyl stearate or methyl stearate with ethyl stearate being most preferred. Examples of the oil and fat rich in triglycerides in which oleic acid is bound at position 2 include high oleic sunflower oil and high oleic safflower oil and it is preferred to use high oleic sunflower oil. The composition ratio (weight ratio) of the oil and fat rich in triglycerides in which oleic acid is bound at position 2 with the lower alkyl ester of stearic acid is preferably 20:80 to 50:50, and more preferably 30:70 to 40:60.

With the content of StOSt type and StO2 type in the above oil and fat composition A being within the above range, low temperature bloom on the chocolate or chocolate-like food can be more inhibited by producing the chocolate or chocolate-like food using mixed oil and fat that contain the oil and fat composition A in an amount within the above range. That is, the above oil and fat composition A can be suitably used as raw material oil and fat (hard butter) of the chocolate or chocolate-like food.

The raw material oil and fat of the above oil and fat are not particularly restricted and the raw material oil and fat described above can be used. In particular, it is preferred to use one or two or more types selected from the above oil and fat composition A, cocoa butter (including cocoa butter contained in cacao mass or the like), an oil and fat rich in the above XOX type triglyceride, palm fractionated oil (palm mid-fraction, palm super olein or the like), and milk fat (including milk fat contained in whole milk powder or the like).

Raw materials used in the production of the chocolate or chocolate-like food of the present invention other than the oil and fat are not particularly restricted as long as they are food materials that are usually used when the chocolate or chocolate-like food is produced; and conventionally known food materials can be used. Examples thereof include sugars such as sucrose (sugar, powdered sugar), lactose, glucose, fructose, maltose, hydrogenated starch glycation product, liquid sugar, enzyme inverted starch syrup, isomerized liquid sugar, sucrose-coupling starch syrup, reducing sugar polydextrose, oligosaccharide, sorbitol, reducing lactose, trehalose, xylose, xylitose, maltitol, erythritol, mannitol, raffinose, or dextrin; dairy products such as whole milk powder or powdered fat-free milk; various powders such as cacao mass, cocoa powder, soy bean powder, soy bean proteins, fruit processed products, vegetable processed products, green tea powder or coffee powder; gums; and starches. Further, additives can be used as long as they are additives that are usually used in a chocolate or chocolate-like food. Examples of the additives include emulsifiers (lecithin, lysolecithin, enzymatically decomposed lecithin, sucrose esters of fatty acid, polyglycerol polyricinoleate, polyglycerol esters of fatty acids, sorbitan esters of fatty acids or the like), antioxidants, coloring agents, and flavoring agents (vanilla flavoring agents or the like). The chocolate or chocolate-like food of the present invention can be produced without using synthetic emulsifiers. Yet, the synthetic emulsifier can be used.

The form of the chocolate or chocolate-like food of the present invention is not particularly restricted and examples of the form of the chocolate or chocolate-like food include a plate-like form, block-like form, chip-like form, chunk-like form, granular form, and coating.

II. Method of Producing Chocolate or Chocolate-Like Food

A method of producing the chocolate or chocolate-like food of the present invention is not particularly restricted and a conventionally known method can be used. As one of the examples, the chocolate or chocolate-like food can be produced by the steps of mixing raw material oil and fat (the above oil and fat composition A, cocoa butter or the like), cacao mass, lecithin, whole milk powder, vanilla flavoring agent, powdered sugar and the like, refining by passing through rollers, conching, tempering, filling and molding.

III. Chocolate Product

A chocolate product in the present invention refers to a complex food product produced by combining the above chocolate or chocolate-like food with other food products. The food product combined with the above chocolate or chocolate-like food is not particularly restricted and examples of the food product combined include nuts and seeds, bakery food products, (for example, baked confectionery such as biscuits or cookies, butter cakes such as pound cakes or fruit cakes, sponge cakes such as short cakes, roll cakes or chiffon cakes, Western-style confectionery such as choux confectionery or pies, breads such as sweetened pastries, doughnuts, Danish pastries, or croissants) and the like. A means of combining the above chocolate or chocolate-like food and food products is not particularly restricted and examples of the means of combining include mixing, adhering, coating, sadwiching, and burying. Chocolate products coated with the chocolate or chocolate-like food of the present invention are hard to crack. Because of this, the chocolate or chocolate-like food of the present invention is suitable for coating.

The nuts and seeds used in the present invention refers to nuts and seeds such as almonds, macadamia nuts, hazelnuts, peanuts or sesame, as described in Standard Tables of Food Composition in Japan. It is preferred that the nuts and seeds be processed ones such as roasted ones, ones whose thin skin is peeled, or shredded ones. In order to impart a crunchy bite unique to the nuts and seeds to chocolate products, it is preferred that the nuts and seeds be ones keeping an original shape thereof, rather than a paste thereof. The amount of nuts and seeds added is preferably 5 to 50% by weight in the chocolate product containing the nuts and seeds, further preferably 10 to 45% by weight, and most preferably 20 to 40% by weight.

IV. Method of Producing Chocolate Product

Methods of producing the chocolate products of the present invention are not particularly restricted and conventionally known methods can be used. As one of the examples, the chocolate product can be obtained by mixture the above chocolate or chocolate-like food tempered and the above nuts and seeds, followed by cool solidification.

V. Method of Inhibiting Low-Temperature Bloom on Chocolate or Chocolate-Like Food (Product)

A method of inhibiting low-temperature bloom on the chocolate or chocolate-like food of the present invention comprises making the content of triglyceride in which oleic acid is bound at position 2 and saturated fatty acids having 16 or more carbon atoms is bound at positions 1 and 3 (XOX type triglyceride) to 50 to 85% by weight, and the content of triglyceride in which two oleic acids are bound and one saturated fatty acid having 16 or more carbon atoms is bound (XO2 type triglyceride) to 5 to 18% by weight in the oil and fat of the chocolate or chocolate-like food. The composition of triglycerides of the oil and fat is as described above (composition of triglycerides other than the XOX type triglyceride and XO2 type triglyceride, the content of trans fatty acid, and raw material oil and fat used are also as described above).

With the composition of the triglycerides in the oil and fat of the chocolate or chocolate-like food being adjusted to the above range, occurrence of the low-temperature bloom can be inhibited. The low-temperature bloom in the present invention refers to bloom that occurs when stored under low temperatures, preferably not more than 25° C., more preferably 5 to 25° C., still more preferably 10 to 25° C., and most preferably 10 to 20° C.

A method of inhibiting low-temperature bloom on the chocolate or chocolate-like food of the present invention comprises blending the oil and fat composition (the above oil and fat composition A) in the oil and fat of the chocolate or chocolate-like food in the amount of 5 to 40% by weight, which oil and fat composition comprises a triglyceride in which oleic acid is bound at position 2 and stearic acid is bound at positions 1 and 3 (StOSt type triglyceride) in the amount of 30 to 50% by weight and a triglyceride in which two oleic acids are bound and one stearic acid is bound (StO2 type triglyceride) in the amount of 20 to 45% by weight. The composition of triglycerides in the oil and fat composition (the above oil and fat composition A) and the amount of the oil and fat composition (the above oil and fat composition A) blended in the oil and fat of the chocolate or chocolate-like food are as described above (the composition of triglycerides other than the StOSt type triglyceride and StO2 type triglyceride, the content of trans fatty acid and raw material oil and fat used are also described above). With the oil and fat composition (the above oil and fat composition A) having the above composition of triglycerides being blended in the oil and fat of the chocolate or chocolate-like food in the amount within the above range, occurrence of the low-temperature bloom can be inhibited.

VI. Low-Temperature Bloom Inhibitor

A low-temperature bloom inhibitor of the present invention comprises a triglyceride in which oleic acid is bound at position 2 and stearic acid is bound at positions 1 and 3 (StOSt type triglyceride) in the amount of 30 to 50% by weight and a triglyceride in which two oleic acids are bound and one stearic acid is bound (StO2 type triglyceride) in the amount of 20 to 45% by weight. The low-temperature bloom inhibitor of the present invention contains the StOSt type triglyceride in the amount of preferably 30 to 47% by weight, and more preferably 35 to 45% by weight; and the StO2 type triglyceride in the amount of preferably 20 to 40% by weight, and more preferably 23 to 38% by weight. The composition of triglycerides of the low-temperature bloom inhibitor is same as that of the oil and fat composition as described above (the composition of triglycerides other than the StOSt type triglyceride and StO2 type triglyceride, the content of trans fatty acid, and raw material oil and fat used are also same as those of the oil and fat composition A described above). By blending the low-temperature bloom inhibitor having the above composition of triglycerides in an oil and fat of the chocolate or chocolate-like food, occurrence of the low-temperature bloom can be inhibited.

The above low-temperature bloom inhibitor is preferably blended in the oil and fat of chocolate or chocolate-like food in the amount of 5 to 40% by weight, more preferably 8 to 35% by weight, and still more preferably 10 to 25% by weight.

EXAMPLES

By way of examples, the present invention will now be described in detail, but it should not be construed that the present invention is limited to the content of the examples below.

Hereinafter, "%" indicates % by weight, unless otherwise noted.

I. Production of Oil and Fat

First of all, an oil and fat used in production a chocolate and/or chocolate-like food were produced as follows. 40 parts by weight of high oleic sunflower oil (containing 85% by weight of triglyceride in which oleic acid is bound at position 2) and 60 parts by weight of ethyl stearate were mixed and transesterified using 1,3-regiospecific lipase, and then subjected to fractionation treatment. The obtained olein fraction was designated as test oil and fat 1 (The Nisshin OilliO Group, Ltd.: manufactured in-house). (The test oil and fat 1 correspond to the above oil and fat composition A). Subsequently, the test oil and fat 1 was subjected to fractionation treatment and the obtained stearin fraction was designated as test oil and fat 2 (The Nisshin OilliO Group, Ltd.: manufactured in-house). Further, a palm mid-fraction was designated test oil and fat 3 (The Nisshin OilliO Group, Ltd.: manufactured in-house). Palm super olein was designated as test oil and fat 4 (The Nisshin OilliO Group, Ltd.: manufactured in-house). Sal fat was designated as test oil and fat 5 (The Nisshin OilliO Group, Ltd.: manufactured in-house). A mixture of the test oil and fat 2, test oil and fat 3, and test oil and fat 4 was designated as test oil and fat 6 (The Nisshin OilliO Group, Ltd.: manufactured in-house).

The ratio (%) of each of the XOX (POP, POSt, StOSt, and StOAr), XO2 (StOO), U3, and X3 type triglycerides in the test oil and fat 1 to 6 produced above was measured by gas chromatography (in reference to JAOCS, vol 70, 11, 1111-1114 (1993)) and a silver ion column-HPLC method (in reference to J. High Resol. Chromatogr., 18, 105-107 (1995)). In addition, the ratio (%) of trans fatty acid content was measured by gas chromatography (in reference to AOCS Ce1f-96. The measurement results are as shown in Table 1. Note that, the ratio of the trans fatty acid was less than 1% in all of the test oil and fat.

TABLE 1

| Triglyceride ratio (%) | Test oil and fat 1 | Test oil and fat 2 | Test oil and fat 3 | Test oil and fat 4 | Test oil and fat 5 | Test oil and fat 6 |
|---|---|---|---|---|---|---|
| XOX | 46.8 | 85.7 | 76.3 | 14.5 | 68.4 | 83.2 |
| POP | 0.1 | 0.3 | 62.6 | 12.2 | 1.0 | 38.9 |
| POSt | 2.9 | 7.5 | 11.5 | 2.1 | 10.9 | 10.5 |
| StOSt | 42.9 | 74.8 | 2.1 | 0.2 | 42.4 | 32.5 |
| StOAr | 0.4 | 1.0 | 0.2 | 0.0 | 12.3 | 0.6 |
| XO2 | 36.9 | 6.1 | 2.5 | 38.9 | 19.7 | 5.4 |
| StO2 | 35.6 | 5.8 | 0.3 | 3.8 | 17.0 | 2.6 |
| U3 | 9.2 | 0.9 | 0.1 | 8.4 | 3.1 | 0.6 |
| X3 | 0.8 | 2.0 | 1.6 | 0.1 | 0.5 | 1.5 |

II. Production of Chocolate and/or Chocolate-Like Food 1

Next, using the test oil and fat 1 to 5 which were produced above, the oil and fat and other raw materials were mixed at a composition ratio shown in Tables 2 and 3. Subsequently, refining and conching were carried out to obtain a chocolate and/or chocolate-like food (milk chocolate) of Examples 1 to 13. The raw materials used in the production are as follows:

Cocoa butter: trade name: TC Cocoa butter, manufactured by Daito Cacao Co., Ltd.

Lecithin: trade name: Lecithin DX, manufactured by The Nisshin OilliO Group, Ltd.

Cacao mass: trade name: Cacao mass QP-M, manufactured by Daito Cacao Co., Ltd.

Whole milk powder: manufactured by Yotsuba Co., Ltd.

Further, Tables 2 and 3 show the total content of oil and fat in the chocolate and/or chocolate-like food, and the ratio (%) of test oil and fat 1 in the oil and fat of the chocolate and/or chocolate-like food.

TABLE 2

| Composition ratio (%) | Example 1 (Comparative) | Example 2 (Comparative) | Example 3 | Example 4 | Example 5 | Example 6 | Example 7 |
|---|---|---|---|---|---|---|---|
| Test oil and fat 1 | | | 5 | 5 | 5 | 5 | 5 |
| Test oil and fat 2 | | 5 | | | | 7.5 | 7.9 |
| Test oil and fat 3 | | | | | | 7 | 11 |
| Test oil and fat 4 | | | | | | | |
| Test oil and fat 5 | | | | | | | |
| Cocoa butter | 19.5 | 14.5 | 14.5 | 11.5 | 19.5 | | |
| Cacao mass | 20 | 20 | 20 | 20 | 20 | 20 | 12 |
| Lecithin | 0.5 | 0.5 | 0.5 | 0.5 | 0.5 | 0.5 | 0.5 |
| Vanilla flavoring agent | 0.05 | 0.05 | 0.05 | 0.05 | 0.05 | 0.05 | 0.05 |
| Whole milk powder | 18 | 18 | 18 | 18 | 18 | 18 | 18 |

TABLE 2-continued

| Composition ratio (%) | Example 1 (Comparative) | Example 2 (Comparative) | Example 3 | Example 4 | Example 5 | Example 6 | Example 7 |
|---|---|---|---|---|---|---|---|
| Powdered sugar | 41.95 | 41.95 | 41.95 | 44.95 | 36.95 | 41.95 | 45.55 |
| Total | 100 | 100 | 100 | 100 | 100 | 100 | 100 |
| Total content of oil and fat (%) | 35 | 35 | 35 | 32 | 40 | 35 | 35 |
| Content of test oil and fat 1 in oil and fat (%) | 0.0 | 0.0 | 14.3 | 15.6 | 12.5 | 14.3 | 14.3 |

TABLE 3

| Composition ratio (%) | Example 8 (Comparative) | Example 9 | Example 10 | Example 11 | Example 12 | Example 13 |
|---|---|---|---|---|---|---|
| Test oil and fat 1 | 1 | 10 | | | | |
| Test oil and fat 2 | 10.9 | 4 | | 8 | | |
| Test oil and fat 3 | 12 | 5.5 | | | | |
| Test oil and fat 4 | | | 4 | 4 | | |
| Test oil and fat 5 | | | | | 5 | 10 |
| Cocoa butter | | | 15.5 | 7.5 | 14.5 | 9.5 |
| Cacao mass | 12 | 20 | 20 | 20 | 20 | 20 |
| Lecithin | 0.5 | 0.5 | 0.5 | 0.5 | 0.5 | 0.5 |
| Vanilla flavoring agent | 0.05 | 0.05 | 0.05 | 0.05 | 0.05 | 0.05 |
| Whole milk powder | 18 | 18 | 18 | 18 | 18 | 18 |
| Powdered sugar | 45.55 | 41.95 | 41.95 | 41.95 | 41.95 | 41.95 |
| Total | 100 | 100 | 100 | 100 | 100 | 100 |
| Total content of oil and fat (%) | 35 | 35 | 35 | 35 | 35 | 35 |
| Content of test oil and fat 1 in oil and fat (%) | 2.9 | 28.6 | 0.0 | 0.0 | 0.0 | 0.0 |

The ratio (%) of each of the XOX (POP, POSt, StOSt, and StOAr), XO2 (StOO), U3 and X3 type triglycerides in the total oil and fat content of the chocolate and/or chocolate-like food of Example 1 to 13 produced above; and the ratio (%) of the trans fatty acid were measured by the same measurement method as the measurement method of the above test oil and fat. The measurement results are as shown in Tables 4 and 5. Note that the ratio of the trans fatty acid was less than 1% in all of the Examples.

TABLE 4

| Triglyceride ratio (%) | Example 1 (Comparative) | Example 2 (Comparative) | Example 3 | Example 4 | Example 5 | Example 6 | Example 7 |
|---|---|---|---|---|---|---|---|
| XOX | 74.8 | 74.8 | 69.2 | 67.6 | 71.3 | 67.3 | 66.2 |
| POP | 13.2 | 11.1 | 11.1 | 10.7 | 11.6 | 17.4 | 22.6 |
| POSt | 34.7 | 30.1 | 29.4 | 28.4 | 30.7 | 16.8 | 13.2 |
| StOSt | 25.4 | 31.9 | 27.3 | 27.2 | 27.6 | 31.7 | 29.2 |
| StOAr | 1.3 | 1.2 | 1.2 | 1.1 | 1.2 | 0.8 | 0.6 |
| XO2 | 3.7 | 3.9 | 8.3 | 8.7 | 7.8 | 8.4 | 8.2 |
| StO2 | 2.3 | 2.7 | 7.0 | 7.4 | 6.4 | 7.2 | 7.0 |
| U3 | 0.2 | 0.3 | 1.8 | 2.0 | 1.6 | 1.9 | 1.9 |
| X3 | 1.5 | 1.5 | 1.4 | 1.3 | 1.4 | 1.4 | 1.4 |

TABLE 5

| Triglyceride ratio (%) | Example 8 (Comparative) | Example 9 | Example 10 | Example 11 | Example 12 | Example 13 |
|---|---|---|---|---|---|---|
| XOX | 70.4 | 62.1 | 66.6 | 66.6 | 72.3 | 69.8 |
| POP | 24.4 | 14.7 | 12.9 | 9.5 | 11.2 | 9.2 |
| POSt | 13.9 | 16.0 | 30.4 | 23.0 | 30.5 | 26.4 |
| StOSt | 30.7 | 30.3 | 22.1 | 32.5 | 27.3 | 29.1 |

TABLE 5-continued

| Triglyceride ratio (%) | Example 8 (Comparative) | Example 9 | Example 10 | Example 11 | Example 12 | Example 13 |
|---|---|---|---|---|---|---|
| StOAr | 0.7 | 0.7 | 1.1 | 1.0 | 2.8 | 4.4 |
| XO2 | 4.4 | 13.0 | 7.6 | 8.1 | 5.9 | 8.1 |
| StO2 | 3.4 | 11.7 | 2.4 | 3.1 | 4.3 | 6.4 |
| U3 | 0.7 | 3.5 | 1.1 | 1.3 | 0.6 | 1.0 |
| X3 | 1.5 | 1.2 | 1.3 | 1.4 | 1.3 | 1.1 |

IV. Production of Chocolate Product 1

Tempered chocolates of Examples 1 to 13 which were produced above 65% by weight and roasted peanuts 35% by weight were mixed and subjected to cool solidification, thereby obtaining chocolate products with peanuts.

V. Evaluation of Chocolate and Chocolate Product 1

The chocolate products with peanuts produced above were stored at 20° C. and, four weeks later, evaluated for the following items (1) to (3). The evaluation results were shown in Tables 6 and 7. In addition, the chocolates of Examples 1 to 13 which were produced above were evaluated for the following item (4). The evaluation results were shown in Tables 6 and 7.

(1) Bloom Resistance Property

The presence of occurrence of low-temperature bloom on the chocolate products was visually checked based on the following criteria.

Evaluation Criteria
5: No occurrence of the bloom was found. And there was a glossy sheen on the surface.
4: No occurrence of the bloom was found.
3: The bloom was not distinctively recognized but the surface was spotty.
2: The occurrence of the bloom was found.
1: The bloom occurred all over.

(2) Texture

The texture of the chocolate products was evaluated based on the following criteria.

Evaluation Criteria
5: The chocolate product was moderately hardness.
4: The chocolate product was slightly soft.
3: The chocolate product was very hard.
2: The chocolate product was soft.
1: The chocolate product was very soft.

(3) Snap Property

The snap property of the chocolate products was evaluated based on the following criteria.

Evaluation criteria
5: Strong snap property was found.
4: Snap property was found.
3: Weak snap property was found.
2: Little snap property was found.
1: No snap property was found.

(4) Mold-Releasing Property

One hundred twenty gram of the tempered chocolate of Examples 1 to 13 produced above was filled in a mold made of polycarbonate and placed in a 10° C. refrigerator for 10 minutes for cool solidification, thereby being molded. The mold made of polycarbonate that was used for the molding had a grid on the bottom surface thereof. The total number of the squares of the grid was 30 (5×6) squares. After the cooling for 10 minutes, the number of the squares which the chocolate peeled off was visually counted and the mold-releasing percentage of the molded chocolate was calculated by a mathematical formula below. The mold-releasing property gives an indication of solidification rate of the chocolate.

Mold-releasing percentage (%)=the number of squares peeled off/the total number of squares×100

TABLE 6

| Evaluation item | Example 1 (Comparative) | Example 2 (Comparative) | Example 3 | Example 4 | Example 5 | Example 6 | Example 7 |
|---|---|---|---|---|---|---|---|
| (1) Bloom resistance property | 2 | 1 | 5 | 5 | 5 | 4 | 3 |
| (2) Texture | 3 | 3 | 5 | 5 | 5 | 5 | 5 |
| (3) Snap property | 5 | 5 | 4 | 4 | 4 | 4 | 4 |
| (4) Mold-releasing property | 70 | 70 | 60 | 60 | 60 | 60 | 60 |

TABLE 7

| Evaluation item | Example 8 (Comparative) | Example 9 | Example 10 | Example 11 | Example 12 | Example 13 |
|---|---|---|---|---|---|---|
| (1) Bloom resistance property | 1 | 4 | 3 | 4 | 5 | 5 |
| (2) Texture | 3 | 4 | 5 | 5 | 5 | 4 |
| (3) Snap property | 5 | 3 | 4 | 4 | 4 | 3 |
| (4) Mold-releasing property | 70 | 20 | 60 | 60 | 40 | 0 |

VI. Production and Evaluation of Chocolate and/or Chocolate-Like Food 2

Next, using the test oil and fat 1 which were produced above, the oil and fat and other raw materials were mixed at a composition ratio shown in Table 8. Subsequently, refining, conching and tempering were carried out to obtain chocolate and/or chocolate-like food (dark chocolate or white chocolate) of Examples 14 to 18. The same cocoa butter, lecithin, cacao mass, and whole milk powder as described above were used in the production. Further, Table 8 shows the total content of oil and fat in the chocolate and/or chocolate-like food and the ratio (%) of test oil and fat 1 in the oil and fat of the chocolate and/or chocolate-like food.

TABLE 8

| Composition ratio (%) | Example 14 | Example 15 | Example 16 | Example 17 | Example 18 |
|---|---|---|---|---|---|
| Test oil and fat 1 | 5 | 12 | 5 | 10 | 15 |
| Cocoa butter | 7 |  | 30 | 25 | 20 |
| Cacao mass | 40 | 40 |  |  |  |
| Lecithin | 0.5 | 0.5 | 0.5 | 0.5 | 0.5 |
| Vanilla flavoring agent | 0.05 | 0.05 | 0.05 | 0.05 | 0.05 |
| Whole milk powder |  |  | 20 | 20 | 20 |
| Powdered sugar | 47.45 | 47.45 | 30 | 30 | 30 |
| Lactose |  |  | 14.45 | 14.45 | 14.45 |
| Total | 100 | 100 | 100 | 100 | 100 |
| Total content of oil and fat (%) | 34 | 34 | 40 | 40 | 40 |
| Content of test oil and fat 1 in oil and fat (%) | 14.7 | 35.3 | 12.5 | 25.0 | 37.5 |

The ratio (%) of each of the XOX (POP, POSt, StOSt, and StOAr), XO2 (StOO), U3 and X3 type triglycerides in the total oil and fat content of the chocolate and/or chocolate-like food of Example 14 to 18 produced above; and the ratio (%) of the trans fatty acid were measured by the same measurement method as the measurement method of the above test oil and fat. The measurement results are as shown in Table 9. Note that the ratio of the trans fatty acid was less than 1% in all of the Examples.

TABLE 9

| Triglyceride ratio (%) | Example 14 | Example 15 | Example 16 | Example 17 | Example 18 |
|---|---|---|---|---|---|
| XOX | 80.1 | 72.0 | 70.2 | 65.3 | 60.5 |
| POP | 13.0 | 9.9 | 11.4 | 9.5 | 7.6 |
| POSt | 34.4 | 26.8 | 30.2 | 25.6 | 21.0 |
| StOSt | 31.1 | 34.0 | 27.2 | 28.9 | 30.6 |
| StOAr | 1.3 | 1.1 | 1.2 | 1.0 | 0.9 |
| XO2 | 9.0 | 15.7 | 7.8 | 11.9 | 15.9 |
| StO2 | 7.5 | 14.2 | 6.4 | 10.5 | 14.7 |
| U3 | 1.5 | 3.4 | 1.3 | 2.4 | 3.6 |
| X3 | 1.6 | 1.4 | 1.4 | 1.3 | 1.2 |

The chocolate and/or chocolate-like food of Examples 14 to 18 which were produced above were stored at 20° C. and, six months later, evaluated for the bloom resistance property. The evaluation of the bloom resistance property was carried out by the evaluation method and evaluation criteria as described above.

As a result, all of the chocolate and/or chocolate-like food of Examples 14 to 18 were given five points.

VII. Production of Chocolate and/or Chocolate-Like Food 3

Next, using the test oil and fat 1, 2, and 6 which were produced above, the oil and fat and other raw materials were mixed at a composition ratio shown in Table 10. Subsequently, refining and conching were carried out to obtain a chocolate and/or chocolate-like food (milk chocolate) of Examples 19 to 24. The same cocoa butter, lecithin, cacao mass, and whole milk powder as described above were used in the production. Further, Table 10 shows the total content of oil and fat in the chocolate and/or chocolate-like food and the ratio (%) of test oil and fat 1 in the oil and fat of the chocolate and/or chocolate-like food.

TABLE 10

| Composition ratio (%) | Example 19 (Comparative) | Example 20 | Example 21 | Example 22 (Comparative) | Example 23 | Example 24 |
|---|---|---|---|---|---|---|
| Test oil and fat 1 |  | 5 | 10 |  | 5 | 5 |
| Test oil and fat 2 |  |  |  |  |  | 5 |
| Test oil and fat 6 |  |  |  | 17.5 | 12.5 | 7.5 |
| Cocoa butter | 24.5 | 19.5 | 14.5 | 7 | 7 | 7 |
| Cacao mass | 20 | 20 | 20 | 20 | 20 | 20 |
| Lecithin | 0.5 | 0.5 | 0.5 | 0.5 | 0.5 | 0.5 |
| Vanilla flavoring agent | 0.05 | 0.05 | 0.05 | 0.05 | 0.05 | 0.05 |
| Whole milk powder | 18 | 18 | 18 | 18 | 18 | 18 |
| Powdered sugar | 36.95 | 36.95 | 36.95 | 36.95 | 36.95 | 36.95 |
| Total | 100 | 100 | 100 | 100 | 100 | 100 |
| Total content of oil and fat (%) | 40 | 40 | 40 | 40 | 40 | 40 |
| Content of test oil and fat 1 in oil and fat (%) | 0.0 | 12.5 | 25.0 | 0.0 | 12.5 | 12.5 |

The ratio (%) of each of the XOX (POP, POSt, StOSt, and StOAr), XO2 (StOO), U3 and X3 type triglycerides in the total oil and fat content of the chocolate and/or chocolate-like food of Example 19 to 24 produced above; and the ratio (%) of the trans fatty acid were measured by the same measurement method as the measurement method of the above test oil and fat. The measurement results are as shown in Table 11. Note that the ratio of the trans fatty acid was less than 1% in all of the Examples.

TABLE 11

| Triglyceride ratio (%) | Example 19 (Comparative) | Example 20 | Example 21 | Example 22 (Comparative) | Example 23 | Example 24 |
|---|---|---|---|---|---|---|
| XOX | 76.1 | 71.3 | 66.4 | 75.0 | 70.5 | 70.7 |
| POP | 13.5 | 11.6 | 9.7 | 23.9 | 19.0 | 14.4 |
| POSt | 35.3 | 30.7 | 26.1 | 22.5 | 21.6 | 21.2 |
| StOSt | 25.8 | 27.6 | 29.3 | 27.3 | 28.6 | 33.7 |
| StOAr | 1.3 | 1.2 | 1.1 | 0.9 | 0.9 | 1.0 |
| XO2 | 3.7 | 7.8 | 11.9 | 4.3 | 8.2 | 8.3 |
| StO2 | 2.3 | 6.4 | 10.6 | 2.3 | 6.4 | 6.8 |
| U3 | 0.2 | 1.3 | 2.4 | 0.4 | 1.4 | 1.6 |
| X3 | 1.5 | 1.4 | 1.3 | 1.4 | 1.3 | 1.4 |

VIII. Production and Evaluation of Chocolate Product 2

Tempered chocolates of Examples 19 to 24 which were produced above 65% by weight and roasted peanuts 35% by weight were mixed and subjected to cool solidification, thereby obtaining chocolate products with peanuts. The chocolate products with peanuts produced above were stored at 20° C. and, four weeks later, evaluated for the bloom resistance property and snap property. The evaluation of the bloom resistance property and snap property was carried out by the evaluation method and evaluation criteria as described above. The evaluation results were shown in Table 12.

TABLE 12

| Evaluation item | Example 19 (Comparative) | Example 20 | Example 21 | Example 22 (Comparative) | Example 23 | Example 24 |
|---|---|---|---|---|---|---|
| (1) Bloom resistance property | 2 | 5 | 5 | 2 | 5 | 5 |
| (3) Snap property | 5 | 4 | 4 | 4 | 4 | 5 |

IX. Production and Evaluation of Chocolate Product 3

The tempered chocolates of Examples 19 to 24 which were produced above were coated onto commercially available biscuits, thereby obtaining chocolate-coated biscuits. The chocolate-coated biscuits produced above were evaluated for the following items (5) to (7). The evaluation results were shown in Table 13.

(5) Drying

Drying at 20° C. at the time of coating the chocolate onto the biscuit was evaluated by the following criteria.

Evaluation Criteria

5: The chocolate was solidified within 5 minutes (the adhesion of the chocolate disappeared).
4: The chocolate was solidified in 5 to 8 minutes.
3: The chocolate was solidified in 8 to 11 minutes.
2: The chocolate was solidified in 11 to 14 minutes.
1: The chocolate was not solidified within 14 minutes.

(6) Stickiness

The chocolate-coated biscuit placed in a packaging material was stored at 29.5° C. for 3 hours. Subsequently, the amount of the chocolate stuck to the packaging material when the packaging material was peeled off was evaluated by the following criteria.

Evaluation Criteria

5: The chocolate did not stick to the packaging material at all.
4: A small amount of the chocolate stuck to the packaging material.
3: The chocolate stuck to the packaging material and the coating was found to be partially peeled off.
2: The chocolate stuck to the packaging material and a half of the coating was found to be peeled off.
1: The entire surface of the coating was stuck to the packaging material.

(7) Cracking

The chocolate-coated biscuit was stored at 20° C., at a relative humidity of about 71% for 2 hours. Cracking of the chocolate were then evaluated by the following criteria.

Evaluation Criteria

5: The cracking was found only in the lateral side.
4: A little cracking was found in the top face.
3: The cracking was found in the top face.
2: The chocolate-coated biscuit was covered entirely with cracks.
1: There was significant cracking all over and a biscuit dough was exposed between cracks.

TABLE 13

| Evaluation item | Example 19 (Comparative) | Example 20 | Example 21 | Example 22 (Comparative) | Example 23 | Example 24 |
|---|---|---|---|---|---|---|
| (5) Drying | 4 | 4 | 4 | 3 | 3 | 4 |
| (6) Stickiness | 4 | 4 | 4 | 3 | 3 | 5 |
| (7) Cracking | 2 | 4 | 3 | 3 | 4 | 3 |

The invention claimed is:

1. An oil and fat composition comprising 30 to 50% by weight of triglyceride in which oleic acid is bound at position 2 and stearic acid is bound at positions 1 and 3 (StOSt type triglyceride), 35.6 to 45% by weight of triglyceride in which two oleic acids are bound and one stearic acid is bound (StO2 type triglyceride), and 0.1 to 1.4% by weight of triglyceride in which oleic acid is bound at position 2 and stearic acid and arachidic acid are bound at each of positions 1 and 3 (StOAr type triglyceride).

2. The oil and fat composition according to claim 1, wherein a content of StOSt type triglyceride is 30 to 47% by weight.

3. The oil and fat composition according to claim 1, wherein said oil and fat composition is one used in a chocolate or chocolate-like food.

4. A method of producing said oil and fat composition according to claim 1,
comprising the step of performing a transesterification reaction with an oil and fat rich in triglyceride in which oleic acid is bound at position 2 and a lower alkyl ester of stearic acid.

5. A method of producing a chocolate or chocolate-like food comprising an oil and fat,
comprising the step of blending the oil and fat composition according to claim 1 in said oil and fat of said chocolate or chocolate-like food in an amount of 5 to 40% by weight.

6. A method of inhibiting low-temperature bloom on a chocolate or chocolate-like food comprising an oil and fat,
comprising the step of blending the oil and fat composition according to claim 1 in said oil and fat of said chocolate or chocolate-like food in an amount of 5 to 40% by weight.

7. A low-temperature bloom inhibitor comprising 30 to 50% by weight of triglyceride in which oleic acid is bound at position 2 and stearic acid is bound at positions 1 and 3 (StOSt type triglyceride), 35.6 to 45% by weight of triglyceride in which two oleic acids are bound and one stearic acid is bound (StO2 type triglyceride), and 0.1 to 1.4% by weight of triglyceride in which oleic acid is bound at position 2 and stearic acid and arachidic acid are bound at each of positions 1 and 3 (StOAr type triglyceride).

* * * * *